United States Patent
Urakami et al.

(10) Patent No.: US 8,089,720 B2
(45) Date of Patent: Jan. 3, 2012

(54) HARD-DISK DRIVE

(75) Inventors: Yosuke Urakami, Kanagawa (JP); Jun Ohno, Kanagawa (JP); Hideaki Maeda, Kanagawa (JP); Hiroyasu Tanabe, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/537,213

(22) Filed: Aug. 6, 2009

(65) Prior Publication Data
US 2011/0069414 A1    Mar. 24, 2011

(30) Foreign Application Priority Data
Aug. 6, 2008    (JP) ................................. 2008-202612

(51) Int. Cl.
*G11B 5/55* (2006.01)
*G11B 5/596* (2006.01)

(52) U.S. Cl. ................ 360/78.08; 360/77.04; 360/78.04

(58) Field of Classification Search .......................... None
See application file for complete search history.

(56) References Cited

U.S. PATENT DOCUMENTS

| | | | | |
|---|---|---|---|---|
| 6,967,810 B2* | 11/2005 | Kasiraj et al. | .................. | 360/55 |
| 7,082,007 B2* | 7/2006 | Liu et al. | .................... | 360/77.02 |
| 7,133,241 B2* | 11/2006 | Che et al. | ........................ | 360/75 |
| 7,372,656 B2* | 5/2008 | Satoh et al. | ..................... | 360/69 |
| 7,394,607 B2* | 7/2008 | Ohno et al. | ..................... | 360/75 |
| 7,430,086 B2 | 9/2008 | Izumi | | |
| 7,443,630 B2* | 10/2008 | Lengsfield et al. | ........ | 360/77.02 |
| 7,486,460 B2* | 2/2009 | Tsuchinaga et al. | ........... | 360/48 |
| 7,679,851 B1* | 3/2010 | Sun et al. | ........................ | 360/48 |
| 2008/0304172 A1* | 12/2008 | Bi et al. | .......................... | 360/48 |

FOREIGN PATENT DOCUMENTS
JP    2006031756    2/2006
* cited by examiner

*Primary Examiner* — Hoa T Nguyen
*Assistant Examiner* — James L Habermehl (57) ABSTRACT

A hard-disk drive. The hard-disk drive includes a magnetic-recording disk in which tracks adjacent to each other are magnetically separated, a spindle motor which drives the magnetic-recording disk, a magnetic-recording head equipped with write element and read element, an actuator for positioning the magnetic-recording head on a predetermined track on the magnetic-recording disk, and a control unit. The control unit is configured to store information about an over-write-only track that is provided for a plurality of tracks including n consecutive tracks in at least a partial radial area of the magnetic-recording disk and an offset amount. In a radial area of the magnetic disk where the over-write-only track is located, the control unit is configured to record with an offset by an offset amount from a center of a track toward the over-write-only track with respect to n−1 tracks of the plurality of n tracks, excluding the over-write-only track.

3 Claims, 8 Drawing Sheets

HARD-DISK DRIVE

CROSS-REFERENCE TO RELATED APPLICATION

This application claims priority from the Japanese Patent Application No. 2008-202612, filed Aug. 6, 2008, the disclosure of which is incorporated herein in its entirety by reference.

TECHNICAL FIELD

Embodiments of the present invention relate to a hard-disk drive, a method for magnetic-recording on a patterned medium of a hard-disk drive and a method for manufacturing the hard-disk drive.

BACKGROUND

For a magnetic-storage device such as a hard-disk drive, it is desirable that the areal density of information recorded on a magnetic-recording disk is high so that the hard-disk drive has a large information-storage capacity. One method of achieving ultra-high-density (UHD) magnetic recording is to employ perpendicular-magnetic-recording (PMR), which is a magnetic-recording technology, in which the magnetization of recorded bits is substantially perpendicular to the surface of the magnetic-recording disk. Another magnetic-recording technology for achieving UHD magnetic recording is patterned-medium magnetic recording, in which the recorded information is confined to patterns in the magnetic-recording medium of the magnetic-recording disk.

Two types of patterned media are known: discrete-track media and bit-cell patterned media. For discrete-track media, a groove is provided in between discrete tracks adjacent to each other on the magnetic-recording disk. For bit-cell patterned media, the discrete tracks are further divided into isolated bit cells. Patterned media may reduce the occurrence of writing to adjacent tracks, which increases the areal density of recorded information beyond what is achievable with unpatterned media. Thus, the track density may be increased on magnetic-recording disks that employ patterned media. However, as the track density of recorded information is increased, "adjacent-track interference" (ATI) can still occur, a term of art, which refers to the effect that the writing of information to one track has on the information recorded on an adjacent track. If ATI occurs, information that has already been recorded on an adjacent track becomes partially over-written and the integrity of recorded information cannot be guaranteed.

SUMMARY

Embodiments of the present invention include a hard-disk drive. The hard-disk drive includes a magnetic-recording disk in which tracks adjacent to each other are magnetically separated in advance, a spindle motor which drives the magnetic-recording disk, a magnetic-recording head equipped with a write element and a read element, an actuator for positioning the magnetic-recording head on a predetermined track on the magnetic-recording disk, and a control unit. The control unit is configured to store information about an over-write-only track that is provided for a plurality of tracks including n consecutive tracks in at least a partial radial area of the magnetic-recording disk and that is not dedicated for the magnetic recording of data, and an offset amount. In a radial area of the magnetic disk where the over-write-only track is located, the control unit is configured to record with an offset by an offset amount from a center of a track toward the over-write-only track with respect to n−1 tracks of the plurality of n tracks, excluding the over-write-only track.

DESCRIPTION OF THE DRAWINGS

The accompanying drawings, which are incorporated in and form a part of this specification, illustrate embodiments of the invention and, together with the description, serve to explain the embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention.

Description of Embodiments of the Present Invention for a Hard-Disk Drive

In accordance with embodiments of the present invention, track density may be increased by fabricating a write element having a narrow write width. As used herein, the write width refers to the width of information recorded on a magnetic-recording medium by the write element of the magnetic-recording head. If the write width of the write element is narrowed, variance in the write width among individual write elements caused by manufacturing variance becomes relatively large and its influence on recording characteristics becomes greater. Also, the size of the magnetic-recording field is changed by variance in the yoke length and shield shape of the write element, and this becomes a contributing factor in the variance of the write width. The write width of the magnetic-recording head influences the information-storage capacity that can be achieved. Under certain circumstances, for example, a magnetic-recording disk that can have a storage capacity T1 when using a write element with a write width Tw1 might only achieve a storage capacity T2, less than T1, when a write element with a write width Tw2, greater than Tw1, is used. Therefore, under circumstances in which write elements are manufactured for which a write width Tw is set at a mid-range design value, if the magnetic-recording heads actually manufactured have, for example, write widths Tw1 and Tw2 due to manufacturing variance, then the storage capacity of the hard-disk drive may vary as a consequence of the actual write widths of the individual magnetic-recording heads, even though the similar magnetic-recording disks may be used. Moreover, if the actual write width of the magnetic-recording head is significantly broader than the design value, a marked influence of adjacent-track interference (ATI) may occur.

In accordance with embodiments of the present invention, ATI may also occur when a discrete-track medium is used at high track density. In a magnetic-recording disk having discrete tracks, tracks on which information is recorded are separated by a groove, thus prescribing the track pitch. Therefore, if the write width is greater than the mid-range design value, writing to one track may affect an adjacent track and ATI occurs, degrading, and perhaps even destroying, the information recorded on the adjacent track. If ATI occurs, recorded information is not a secure. Moreover, if an attempt is made to increase the groove width and thus alleviate the influence of variance in write width, the magnetic-recording track width is decreased accordingly and sufficient recording space cannot be secured on the magnetic-recording disk. Therefore, increasing the track density may prove to be difficult unless manufacturing variance in the write width of the write element is more tightly controlled.

In accordance with embodiments of the present invention, on a magnetic-recording disk having discrete tracks, grooves are predefined at a predetermined pitch; and therefore, the tracks separated by the grooves are formed at a predetermined pitch. Write elements are manufactured so as to have a write width of a given design value, which coincides with the predetermined pitch of tracks. However, the actual write width varies among individual write elements because of manufacturing variance and the manufactured write elements may include those having a write width broader than the design value. Therefore, a write element having a write width broader than a maximum allowable write width cannot be utilized in the manufacture of the hard-disk drive.

In accordance with embodiments of the present invention, an allowable write width for discrete tracks is next described. In the case of recording to discrete tracks, an allowable write width is restrained to the sum of the average patterned cross-track width and twice the groove width, or less. However, the specification for the allowable write width becomes more restrictive if misalignment of the magnetic-recording head at the time of recording is taken into account. For example, under circumstances that employ a design such that magnetic recording is carried out if the permissible off-track tolerance is equal to or less than +15% of the track pitch from the track center position, an available write width range is established by the ratio of patterned cross-track width to groove width. In this case, the write width decreases as the groove width decreases, and the yield of magnetic-recording heads that may be employed in a hard-disk drive having such an off-track tolerance is lowered by variance in the manufacturing process for fabricating magnetic-recording heads.

In accordance with embodiments of the present invention, on the other hand, if an attempt to improve the yield of the hard-disk drive is made by increasing the value of the maximum allowable write width and thus expanding the range of write width of the write element that can be utilized in the hard-disk drive, the track pitch may be expanded to accommodate the increased maximum allowable write width but at the cost of a lowered track density. Consequently, if not for embodiments of the present invention, a magnetic-recording disk having discrete tracks is faced with seemingly opposite manufacturing metrics of: high yields for a hard-disk drive manufactured with such a magnetic-recording disk; versus increased track density, and concomitantly high areal density, for the storage of recorded information on such a magnetic-recording disk in a hard-disk drive. Moreover, even if a magnetic-recording head is selected with reference to the write width and a hard-disk drive is thus assembled, ATI might not be evident until after the hard-disk drive is assembled.

Embodiments of the present invention provide, in a hard-disk drive using a patterned medium, for increased yields of the hard-disk drive and the magnetic-recording head and reduced costs notwithstanding manufacturing variances. Moreover, in accordance with embodiments of the present invention, in a hard-disk drive using a patterned medium, magnetic recording is performed by excluding a portion of tracks in a plurality of adjacent tracks as determined by the write-width characteristic of the magnetic-recording head used and as determined by predetermined rules.

In accordance with embodiments of the present invention, a hard-disk drive includes a magnetic-recording disk in which tracks adjacent to each other are magnetically separated in advance, a spindle motor which drives the magnetic-recording disk, a magnetic-recording head equipped with a write element and a read element, an actuator for positioning the magnetic-recording head on a predetermined track on the magnetic-recording disk, and a control unit. In accordance with embodiments of the present invention, the control unit is configured to store information about an over-write-only track that is provided for a plurality of tracks including n consecutive tracks in at least a partial radial area of the magnetic-recording disk and that is not dedicated for the magnetic recording of data, and an offset amount. In accordance with embodiments of the present invention, in a radial area of the magnetic-recording disk where the over-write-only track is located, the control unit is configured to record with an offset by an offset amount from a center of a track toward the over-write-only track with respect to n−1 tracks of the plurality of n tracks, excluding the over-write-only track.

In one embodiment of the present invention, the hard-disk drive is configured with a set of three consecutive tracks; a track at the center of the set is configured as an over-write-only track that is not used for magnetic recording of data; and, the tracks on both sides of the over-write-only track are configured to receive recorded data so that the tracks on both sides of the over-write-only track may be used in at least a part of an information-storage area. In an embodiment of the present invention, the recording position is offset from the center of a track toward the over-write-only track and only the center track is over-written. Because data is not written to the track located at the center of three consecutive tracks, if the track located at the center is over-written, no degradation of data recorded to the center track can occur. Therefore, when a write element having a write width broader than a design value is used, by over-writing the center track, ATI of a data track is avoided. Thus, even when the write width of a magnetic-recording head is greater than a design value because of manufacturing variance, the magnetic-recording head can be used; and, increased yields of the hard-disk drive and the magnetic-recording head, and a reduction in cost of manufacturing the hard-disk drive may be achieved.

In another embodiment of the present invention, a set of two consecutive tracks may be formed and one of these tracks may be configured as an over-write-only track that is not used as a data track, or a track on which data is magnetically recorded.

In yet another embodiment of the present invention, a substantially defective track that has been confirmed as defective in a separate operation of another testing unit may be configured as the over-write-only track.

Embodiments of the present invention provide that even a magnetic-recording head having a broad write width due to manufacturing variance, which typically could not be used, can be utilized for manufacturing the hard-disk drive. Thus, embodiments of the present invention provide that, in a hard-disk drive using a patterned medium, the manufacturing yields of the magnetic-recording head and the hard-disk drive may be increased; and, consequently, the costs of manufacturing may be reduced.

EXAMPLE 1

Figure 1:
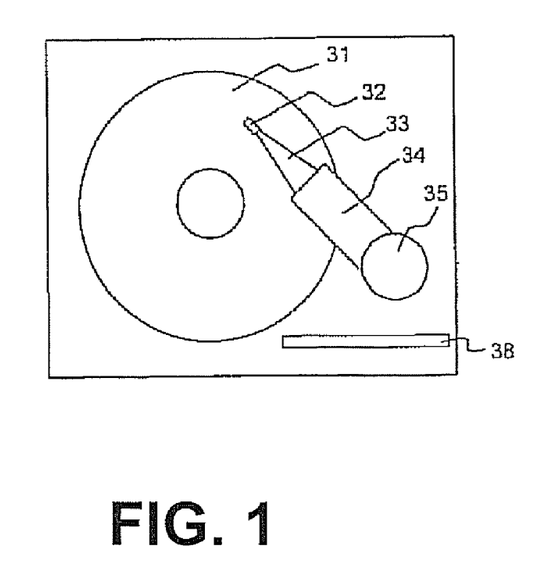
FIG. 1 is a schematic view of a hard-disk drive, in accordance with an embodiment of the present invention.

With reference now to FIG. 1, in accordance with an embodiment of the present invention, a schematic view showing an example of a hard-disk drive according to the invention is shown. Embodiments of the present invention may be applied to a perpendicular hard-disk drive of a discrete-track recording system employing a perpendicular-magnetic-recording (PMR) system. The PMR hard-disk drive shown in FIG. 1 includes a magnetic-recording disk 31, a spindle 36 which rotationally drives the magnetic-recording disk 31, a magnetic-recording head 32, a supporting spring mechanism 33 having the magnetic-recording head 32 attached to its distal end, a arm 34 which holds the supporting spring mechanism 33, a voice coil motor 35 which drives the arm 34, and a control unit 38 which controls the voice coil motor 35 to position the magnetic-recording head 32 on a desired track on the magnetic-recording disk 31, and a housing (not shown). In one embodiment of the present invention, a plurality of magnetic-recording disks, of which magnetic-recording disk 31 is an example, may be provided in a housing of a hard-disk drive; magnetic-recording heads and arms, of which the magnetic-recording head 32 and the arm 34 are examples, are provided in the same number as the number of magnetic-recording surfaces of the magnetic-recording disks. A write element and a read element are provided on the magnetic-recording head 32. For example, a single-magnetic pole write head may be used as the write element of the magnetic-recording head. For example, a tunneling-magneto-resistive (TMR) head may be used as the read element of the magnetic-recording head. In the case of using a single-magnetic pole write head as the write element, the magnetic-recording disk may have a bi-layer magnetic-recording medium having a soft magnetic layer underlying a hard magnetic-recording layer.

Figure 2:
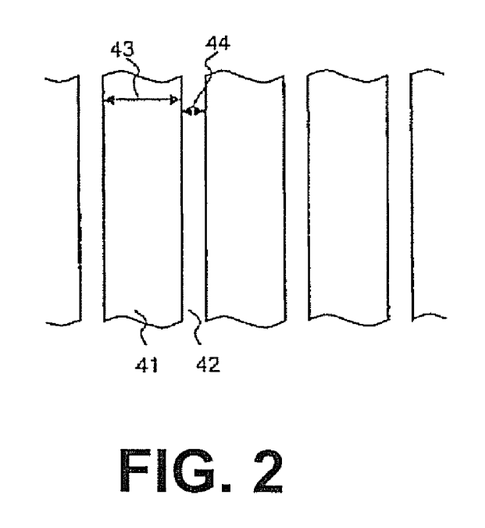
FIG. 2 is an explanatory view of a discrete-track medium, in accordance with an embodiment of the present invention.

With reference now to FIG. 2, in accordance with an embodiment of the present invention, a magnetic-recording disk utilizing a discrete-track medium is shown as an example patterned medium. In a discrete-track medium, the recording layer of the medium is patterned to form tracks, of which track 41 is an example. A groove 42 which excludes the recording layer is provided between tracks. The width 43 of a track is called patterned cross-track width. The width 44 of a groove is called the groove width.

In accordance with embodiments of the present invention, an application of a method of the recording system is next described in which one embodiment of the present invention includes a combination of a magnetic-recording head having an appropriate average write width within a certain range and a discrete-track medium having a track pitch. As an example of specific procedures, in an inspection process after the hard-disk drive is assembled, the influence of ATI is checked at each radial position on the magnetic-recording disk, and if ATI that causes data degradation is present, the recording system of an embodiment of the present invention is applied. Since the influence of ATI differs depending on the radial position, the amount of ATI is determined at each radial position.

Figure 3:
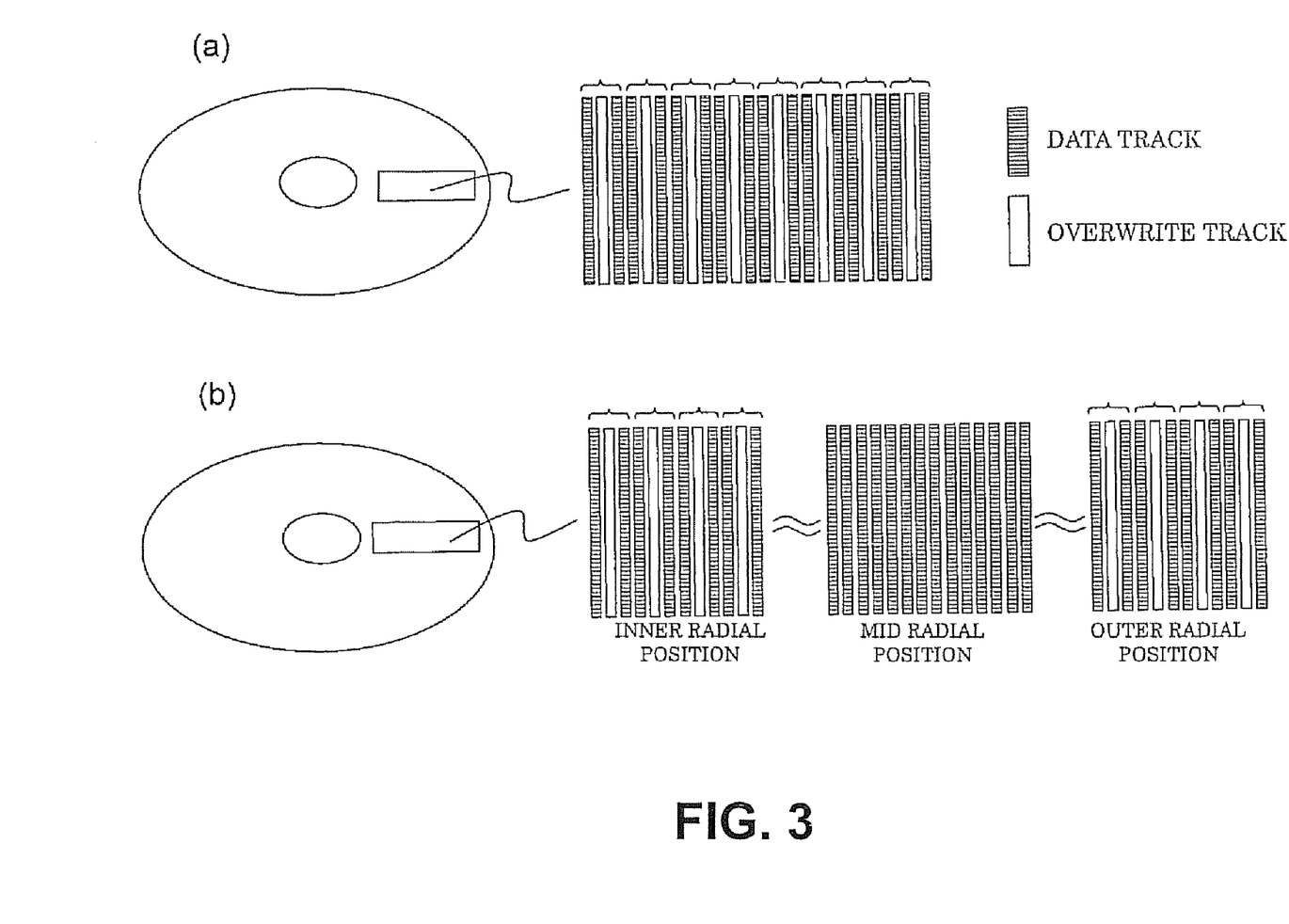
FIG. 3 is an overall view of a magnetic-recording medium, in accordance with an embodiment of the present invention.
Figure 4:
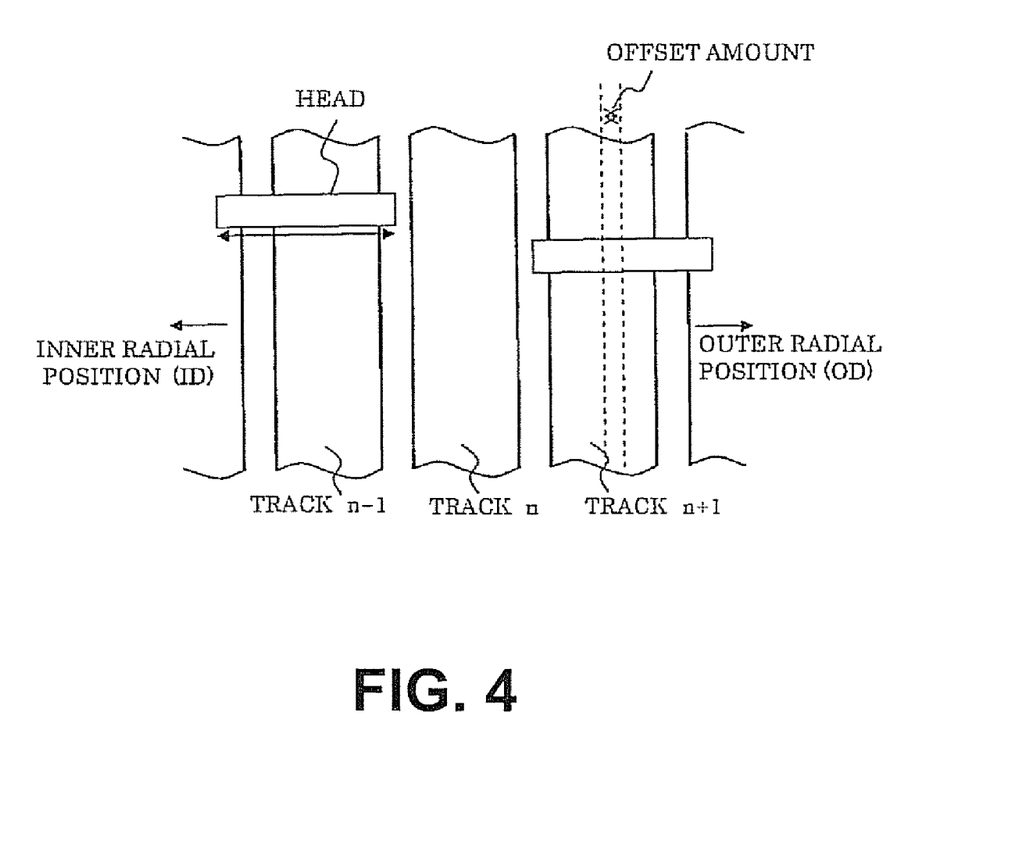
FIG. 4 is an explanatory view of an offset amount, in accordance with an embodiment of the present invention.

With reference now to FIGS. 3(a), 3(b) and 4, in accordance with an embodiment of the present invention, first, the use at an ordinary track pitch is tried. The present system is applied to a portion of the magnetic-recording disk where ATI occurs as a result. As shown in FIG. 3(a), two tracks on the outer side of three consecutive tracks are used as data tracks and the center track is used as an over-write-only area. In other words, the center track is configured as a waste track on which no data is saved. Therefore, when recording to the data tracks on the outer side, recording is carried out with an offset toward the over-write-only track at the center. The offset amount represents the amount of shift from the center of the recording track, as shown in FIG. 4. In particular, when the magnetic-recording head direction and the track direction shift on inner radial positions and outer radial positions and thus generates a skew angle, ATI may occur only in the region of inner radial positions or outer radial positions. Under these circumstances, in accordance with one embodiment of the present invention, the recording method can be applied to a specified radial area on the disk, as shown in FIG. 3(b).

Figure 5:
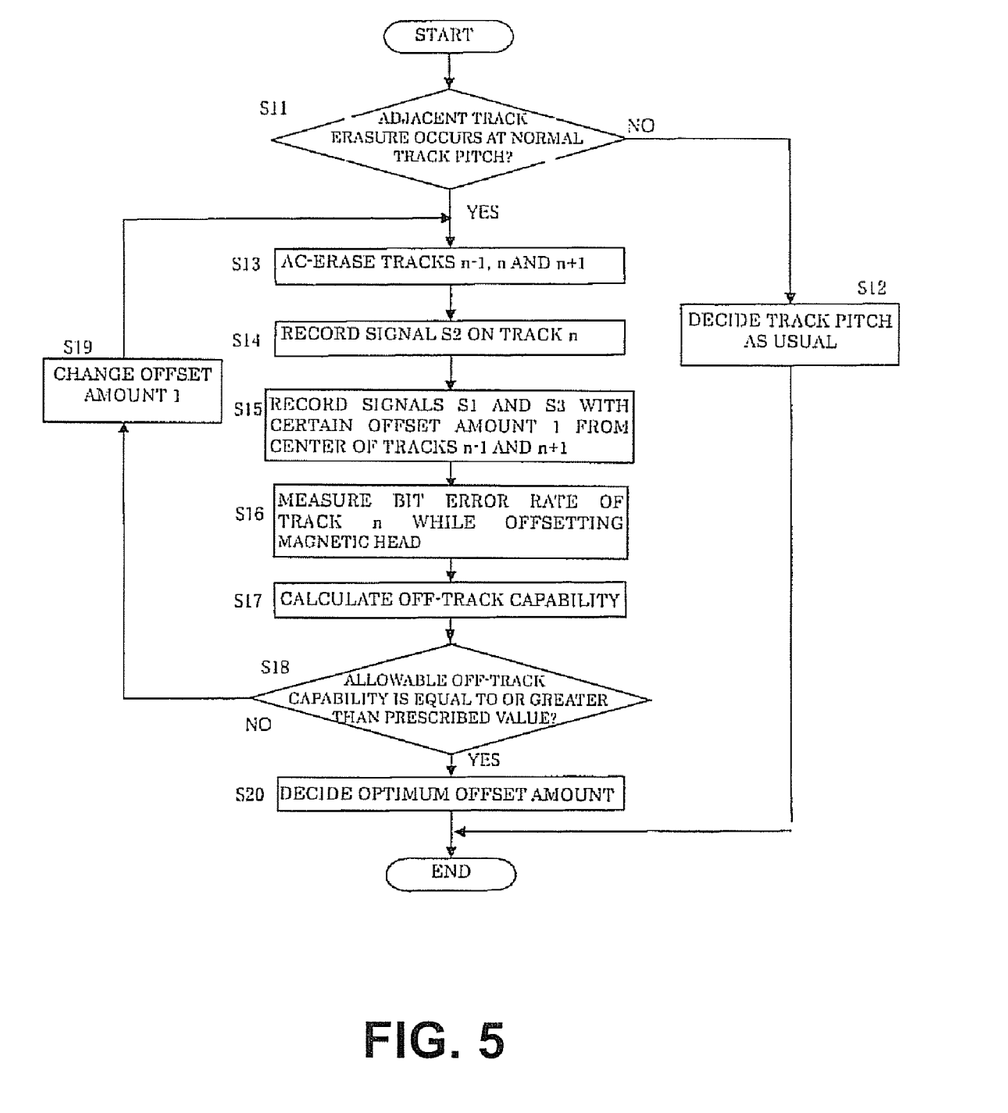
FIG. 5 is a flowchart showing procedures to establish an offset amount, in accordance with an embodiment of the present invention.

With reference now to FIGS. 4 and 5, in accordance with an embodiment of the present invention, a method for establishing the offset amount is described. FIG. 5 is a flowchart showing procedures to establish the offset amount. First, at S11, it is checked whether ATI occurs, or not, when writing is carried out at a normal track pitch at each radial position on the magnetic-recording disk. At S12, if ATI has not occurred, a normal track pitch is employed. If ATI occurs, ATI is determined by using three tracks and an optimum offset amount is established. As shown in FIG. 4, tracks are named track n−1, track n and track n+1 from the inner radial side. At S13, the three tracks, that is, track n−1, track n and track n+1, are AC-erased; and, at S14, a signal S2 is recorded to the center track n. Next, at S15, signals S1 and S3 are recorded to the tracks n−1 and n+1 with a certain offset amount 1 from their center. Then, at S16, while the read element of the magnetic-recording head is offset, the bit error rate of the track n is measured. At S17, from data read by the read element, an allowable off-track amount is calculated. At S18, it is determined whether the allowable off-track amount meets a prescribed value, or not.

Figure 6:
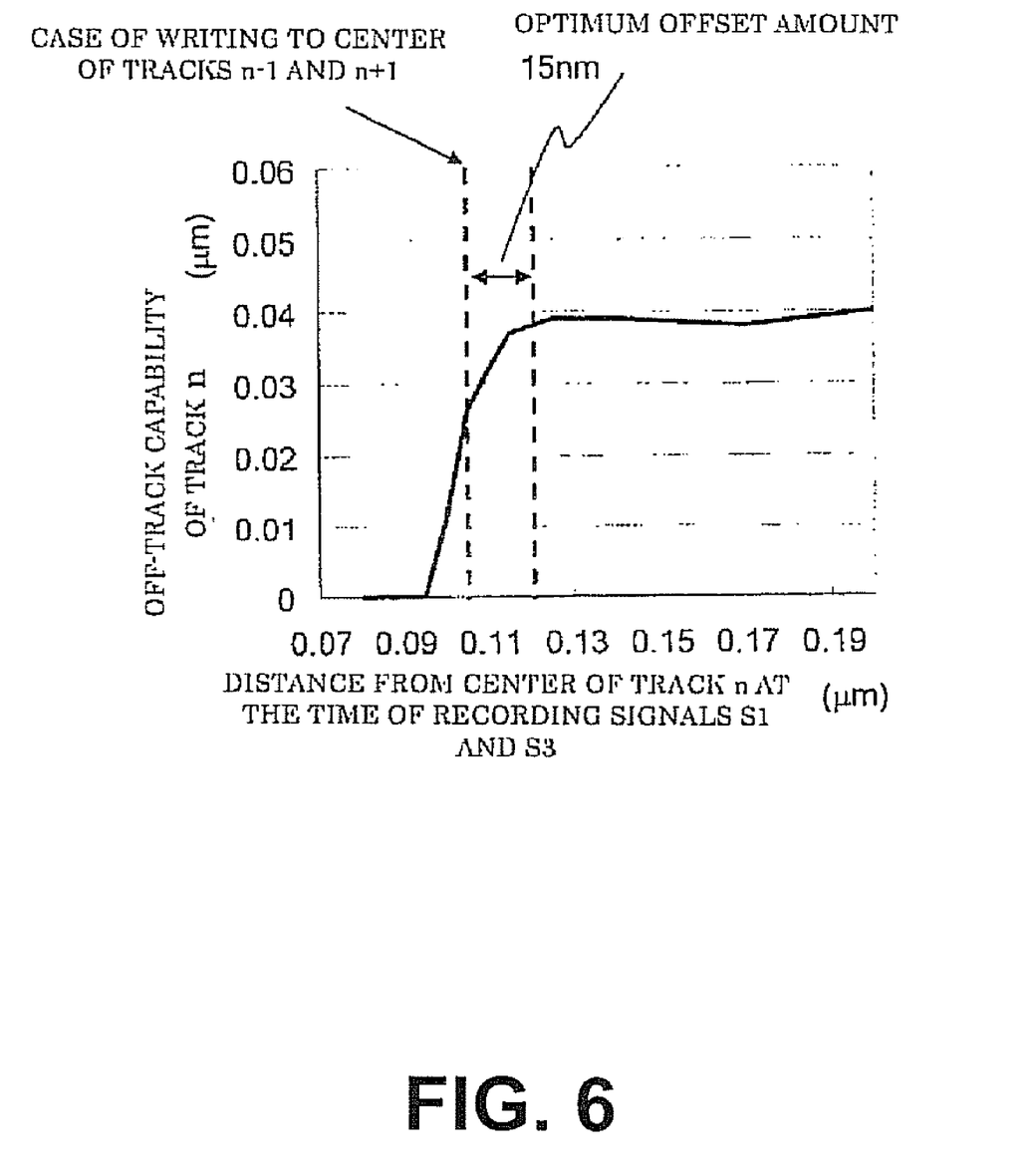
FIG. 6 is a view showing the relation between an offset amount and an allowable off-track amount, in accordance with an embodiment of the present invention.

With reference now to FIG. 6 and further reference to FIG. 5, in accordance with an embodiment of the present invention, an allowable off-track amount refers to a limit value of a reading track shift at which data can be correctly read. To determine this limit value, a measurement of the bit error rate is carried out while the read element is shifted off the track, and the range that meets the bit error rate standard of the hard-disk drive is calculated. The relation between the track pitch and the allowable off-track amount at the time of recording the signals S1 and S2 is shown in FIG. 6. In this example, an allowable off-track amount that meets $1 \times 10^{-3}$ is measured as the bit error rate standard. At S19, the track pitch is increased to a predetermined value; and an allowable off-track amount is calculated at each track pitch. In this example, an optimum offset position is designated as a point where the allowable off-track amount is not reduced. If recording is done at the track pitch of the discrete track, the allowable off-track amount is reduced, which is the case for writing to the center of the tracks n and n−1. Thus, at the recording position where the allowable off-track amount is not reduced, the offset amount is 15 nm. In particular, under circumstances where the radial position is changed, it may be better in some cases to change the offset amount on each of the tracks n−1 and n+1. In such cases, an optimum offset amount 1 on the track n−1 is established first and then an optimum offset amount 2 on the track n+1 is established, as shown in and next described in the discussion of FIG. 7.

Figure 7:
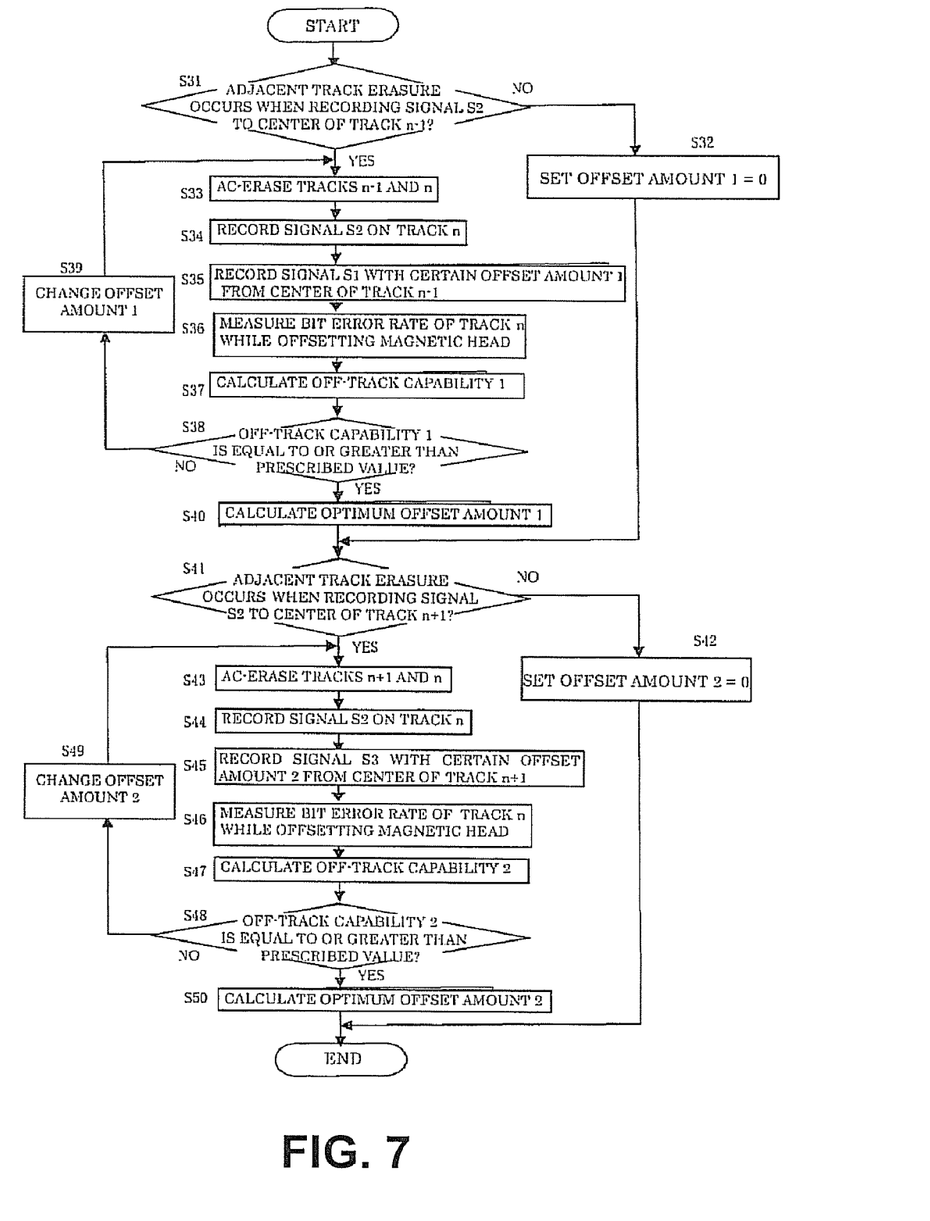
FIG. 7 is a flowchart showing procedures to establish an offset amount, in accordance with an embodiment of the present invention.

With reference now to FIG. 7, in accordance with an embodiment of the present invention, in establishing the optimum offset amount 1 on the track n−1, at S31, it is checked whether ATI occurs, or not, when the signal S2 is recorded to the center of the track n−1. At S32, if ATI does not occur, the offset amount on the track n−1 is set to 0. If ATI occurs, the optimum offset amount is established in the following procedure. At S33, the tracks n−1 and n are AC-erased; and, at S34, the signal S2 is recorded to the track n. Next, at S35, the signal S1 is recorded with a certain offset amount 1 from the center of the track n−1. After completion of S35, at S36, while the magnetic-recording head is offset, the bit error rate of the track n is measured; and, at S37, an allowable off-track amount 1 is calculated. At S38, it is determined whether this allowable off-track amount 1 meets a prescribed value, or not. At S39, if the prescribed value is not met, the offset amount at the time of recording the signal S1 is changed and the measurement is repeated. At S40, the offset amount that meets the prescribed value is designated as the optimum offset amount 1.

With further reference to FIG. 7, in accordance with an embodiment of the present invention, next, at S41, the optimum offset amount 2 on the track n+1 is established. First, it is checked whether ATI occurs, or not, when the signal S2 is recorded to the center of the track n+1. At S42, if ATI does not occur, the offset amount on the track n+1 is set to 0. At S43, if ATI occurs to the track n, the tracks n and n+1 are AC-erased; and, at S44, the signal S2 is recorded to the track n. Next, at S45, the signal S3 is recorded with a certain offset amount 2 from the center of the track n+1. After completion of S45, at S46, while the magnetic-recording head is offset, the bit error rate of the track n is measured; and, at S47, an allowable off-track amount 2 is calculated. At S48, it is determined whether this allowable off-track amount 2 meets a prescribed value, or not. At S49, if the prescribed value is not met, the offset amount at the time of recording the signal S3 is changed and the measurement is repeated. At S50, the offset amount that meets the prescribed value is designated as the optimum offset amount 2. In this manner, the optimum offset amounts 1 and 2 on the tracks n−1 and n+1 are established, respectively. On a (3n−2)th track (where n=1, 2, . . . ), writing is carried out at a position shifted outward from the center position of the track by the optimum offset amount 2. On a 3n-th track (where n=1, 2, . . . ), writing is carried out at a position shifted inward by the optimum offset amount 1.

Figure 8:
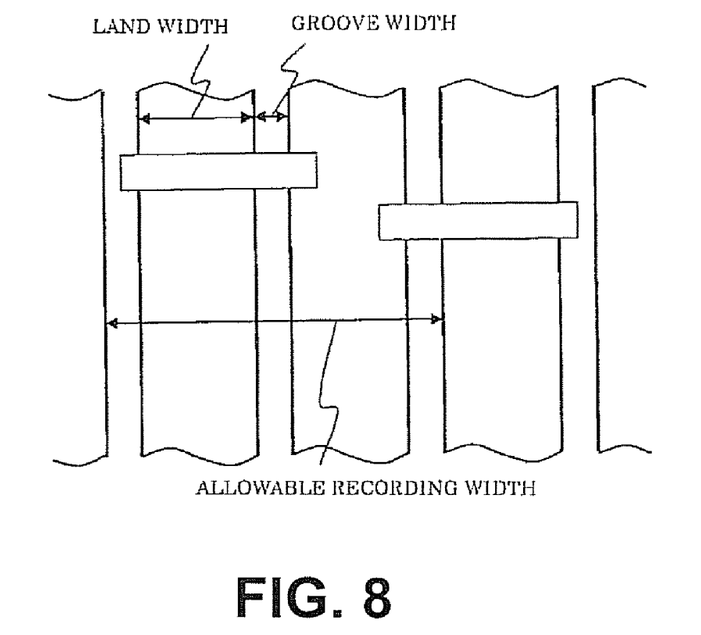
FIG. 8 is an explanatory view of an allowable write width, in accordance with an embodiment of the present invention.

With reference now to FIG. 8, in accordance with an embodiment of the present invention, since the allowable write width is the sum of twice the patterned cross-track width and three times the groove width, the range of magnetic-recording heads that can be used is greatly expanded. This also means that a magnetic-recording head having a large magnetic-recording field can be used, and there is an increased signal-to-noise ratio (SNR), as well.

With further reference to FIGS. 5 and 7, in accordance with embodiments of the present invention, information about the optimum offset amount found in the flowchart of FIG. 5 and the track area to which this is applied, or information about the optimum offset amounts 1 and 2 found according to the flowchart of FIG. 7 and the track area to which this is applied, is recorded in a memory, or alternatively, is recorded in a control information recording area on the track. In recording the information, the control unit 38 carries out selection of a recording track and control of the offset amount by using the information about the optimum offset amount and the track area to which this is applied, which is recorded in the memory. As described above, in accordance with embodiments of the present invention, the manufacturing yields of the magnetic-recording head and the manufacturing yields of the hard-disk drive are increased. Moreover, under circumstances where a magnetic-recording disk having different track pitches is prepared in advance, the recording system according to the invention can be used if ATI causes data degradation after the hard-disk drive is assembled. In addition, embodiments of the present invention are not limited to PMR; but, embodiments of the present invention may also be applied to longitudinal magnetic recording.

EXAMPLE 2

In another embodiment of the present invention, Example 2 is next described. The basic hard-disk-drive configuration of Example 2 is similar to the configuration of Example 1 shown in FIG. 1. In accordance with an embodiment of the present invention of Example 2, a magnetic-recording head having a write width broader than an optimum value with respect to a medium track pitch is set to be intentionally used prior to the stage of assembling the hard-disk drive. The write width of the write element can be measured. Writing to a magnetic-recording medium is carried out by using the manufactured write element, and the write width can be estimated from the amplitude of a signal read out by scanning the magnetic-recording information in the radial direction with the read element.

In the embodiment of the present invention of Example 2, the extent of ATI must be first determined and an allowable offset amount on an over-write-only track that is not used as a data track must be established. The over-write-only track in this case is a track on which no data is written and writing is carried out in the process of recording the two adjacent tracks, as described with reference to FIG. 3(a). Meanwhile, the offset amount is an amount of shift from the center of a recording track, as shown in FIG. 4. In particular, it can be considered that ATI occurs only when a skew is generated on inner and outer radial positions. In this circumstance, the method of Example 2 can be applied in part, as shown in FIG. 3(b). The offset amount is established by a method similar to that of Example 1.

In an embodiment of the present invention of Example 2, the recording capacity becomes ⅔ per disk. However, in assembling the disks into the hard-disk drive, the number of recording surfaces of the magnetic-recording disks to be used in the hard-disk drive is established based on the total capacity that is specified for the hard-disk drive. For example, the total capacity can be adjusted to a ⅚ capacity in the case where the embodiment of the present invention of Example 2 is applied to two recording surfaces of two magnetic-recording disks; and, a ¾ capacity in the case where the embodiment of the present invention of Example 2 is used for three recording surfaces. In this case, a magnetic-recording medium having a narrow track pitch is prepared as a standard and the method described in Example 1 is used for recording in the case of a magnetic-recording head having an excessively broad write width. Thus, the manufacturing cost of the hard-disk drive can be reduced.

In an embodiment of the present invention of Example 2, surface information of the magnetic-recording disk to which this recording system is applied, and information about the over-write-only track and the offset amount are recorded in the memory, or alternatively, are recorded in a control information recording area on the track. The control unit 38 carries out selection of a recording track and control of the offset amount by using the information.

EXAMPLE 3

In Example 3, in another embodiment of the present invention, in the case where the write width is broad and ATI occurs, adjustment of writing current, Iw, to the write element is also used. As the writing current, Iw, is changed, the write width can be adjusted. The basic hard-disk-drive configuration in the embodiment of the present invention of Example 3 is similar to the configuration of Example 1 shown in FIG. 1. In the embodiment of the present invention of Example 3, ordinary recording is first carried out at each radial position; and, whether ATI occurs, or not, is confirmed by measurement of the error rate on adjacent tracks. For example, if a skew is generated to cause ATI, the writing current, Iw, is decreased, and in combination with the adjustment of the write width, an optimum writing current, Iw, that does not cause ATI at each radial position is found.

In an embodiment of the present invention of Example 3, if ATI occurs, first, the allowable off-track amount is measured with respect to the track n described in FIG. 4, while the writing current, Iw, is changed. In this procedure, the minimum, Iw, value that can meet a prescribed allowable off-track amount is designated as an optimum, Iw, value. The optimum, Iw, value is measured at each radial position and the optimum, Iw, value is used at each radial position. The adjustment of, Iw, alone may not achieve a satisfactory write width. In the case where ATI occurs even if, Iw, adjustment is used, the method described in Example 1 is used to find an optimum offset amount.

In an embodiment of the present invention of Example 3, information on the optimum writing current and information on the over-write-only track and the offset amount are recorded in the memory, or alternatively, are recorded in a control information recording area on the track. The control unit 38 controls the writing current by using the information and carries out selection of a recording track and control of the offset amount. As this system is used, reduction in the recording capacity can be restrained to the minimum level, and at the same time, the manufacturing yields of hard-disk drives can be increased.

EXAMPLE 4

In Example 4, in another embodiment of the present invention, the basic hard-disk drive configuration is similar to the configuration in Example 1 shown in FIG. 1. If defects on a magnetic-recording medium are present, an effective recording capacity can be increased by using a substantially defective track as an over-write-only track. The places where defects exist are registered by performing inspection in advance. It is possible to determine, from the inspection data, the most defective track of (3n−2)th, (3n−1)th and 3n-th tracks (where n=1, 2, 3, . . . ). In an embodiment of the present invention of Example 4, the most defective track of these is used as an over-write-only track, so that an increase in recording capacity may be obtained.

In an embodiment of the present invention of Example 4, ATI is first checked at each radial position. ATI is determined by using three tracks and an optimum offset amount is established. As shown in FIG. 4, the tracks are named track n−1, track n and track n+1 from the inner radial side. As shown in the flowchart of FIG. 5, first, the signal S2 is recorded to the center track n of the three tracks. Next, the signals S1 and S3 are recorded with a certain offset amount 1 from the center of the tracks n−1 and n+1. The bit error rate of the track n is measured while the magnetic-recording head is offset. An allowable off-track amount is calculated from that data and it is determined whether a prescribed value is met, or not. In an embodiment of the present invention of Example 4, the one track that is found most defective by the above defect inspection is selected as an over-write-only track from the tracks 3n−2, 3n−1 and 3n. The determination of an optimum offset is carried out by a method similar to that of Example 1.

In an embodiment of the present invention of Example 4, information about the over-write-only track and the offset amount is recorded in the memory, or alternatively, is recorded in a control information recording area on the track. The control unit 38 carries out selection of a recording track and control of the offset amount by using the information. Even if a defective track is generated because of processing inaccuracy with respect to a certain recording track and an intended patterned medium is not realized, the manufacturing yields of the magnetic-recording medium are increased by using the present method of the embodiment of the present invention of Example 4.

EXAMPLE 5

Figure 9:
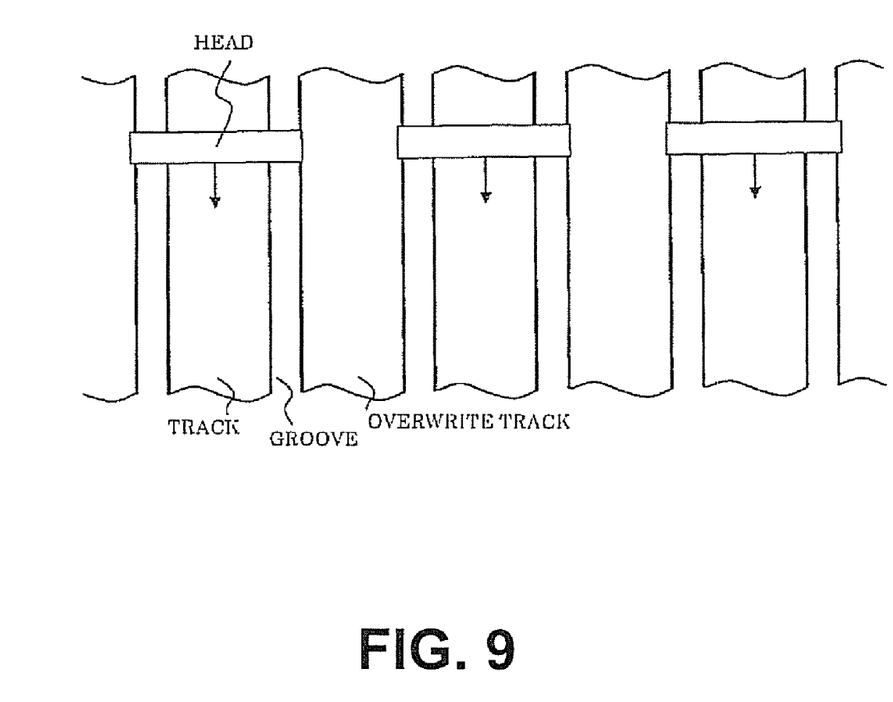
FIG. 9 is a view showing an example where one of two consecutive tracks is configured as a data track and the remaining track is configured as an over-write-only track, in accordance with an embodiment of the present invention.

For Example 5, with reference now to FIG. 9, in another embodiment of the present invention, one of two tracks is used in order to enhance resistance against ATI. The basic hard-disk drive configuration of Example 5 is similar to the configuration of Example 1 shown in FIG. 1. On an immediately adjacent track to a track being written, the error rate may deteriorate due to the magnetic-recording field emanating from the write element of the magnetic-recording head writing the track. Under these circumstances, writing is carried out on a 2n-th track. By skipping one track for recording, it is possible to increase reliability. In this configuration, one track of a set of two consecutive tracks is used as a data track and the remaining one track is used as an over-write-only track.

In an embodiment of the present invention of Example 5, by changing the recording order, it is also possible to reduce the influence of ATI. For example, in the hard-disk drive described in Example 1, recording is first carried out on a (3n−2)th track (where n=1, 2, . . . ) of consecutive tracks. In this case, since a data track exists at intervals of two tracks, the influence of ATI can be significantly reduced. If the interval of two tracks causes the capacity to be insufficient, recording can be carried out on a 3n-th track (where n=1, 2, . . . ). As recording is done in this order, the influence of ATI can be restrained to the minimum level. The method for establishing the offset amount is similar to that of Example 1.

In an embodiment of the present invention of Example 5, information about the over-write-only track and the offset amount is recorded in the memory, or alternatively, is recorded in the control information recording area on the track. The control unit 38 carries out selection of a recording track and control of the offset amount by using the information. While a discrete-track medium is described above, similar effects can be achieved by applying the invention to a bit-cell patterned medium in which a magnetic-recording layer of the magnetic-recording medium is patterned on a bit-cell basis, not only in a cross-track direction, but also in a down-track direction. Up to this point, the manufacturing variances due to the variance of the track width of the write element have been considered. However, in accordance with embodiments of the present invention, similar results can be achieved when variances in positioning accuracy are the result of variances in magnetic-recording disk processing, or similar sources of variance affecting the magnetic-recording disk.

EXAMPLE 6

Figure 10:
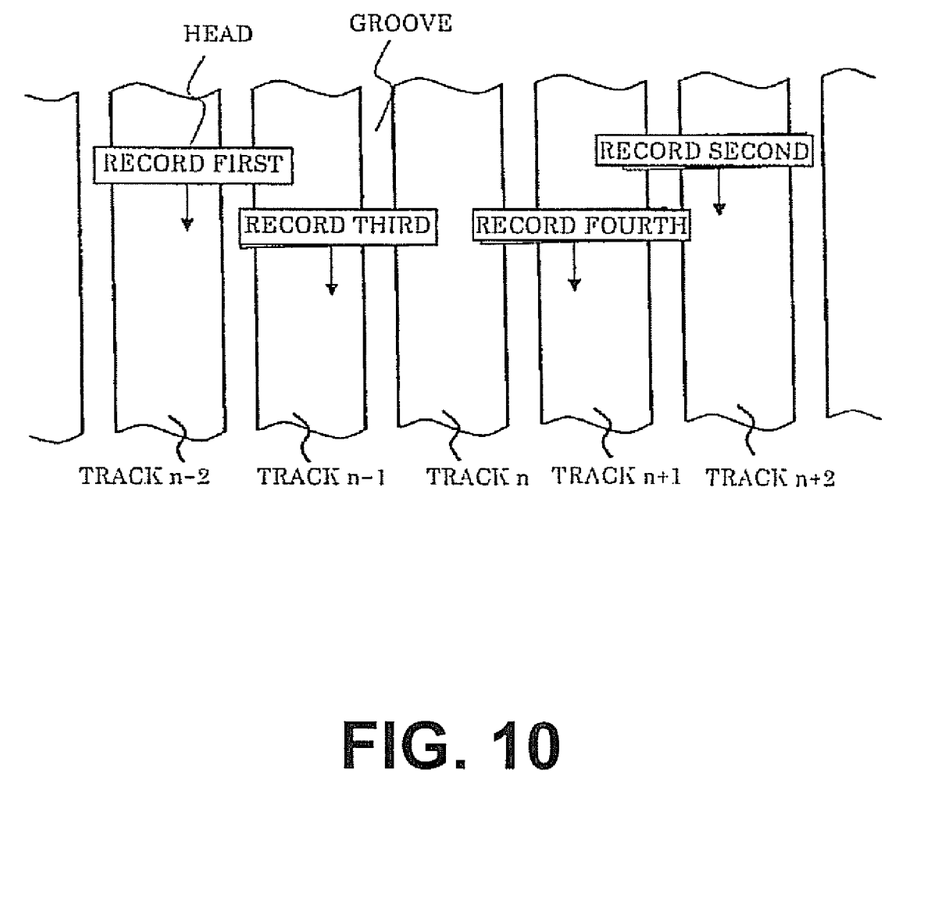
FIG. 10 is a view showing an example where a center track of five tracks is configured as an over-write-only track, in accordance with an embodiment of the present invention.

For Example 6, with reference now to FIG. 10, in another embodiment of the present invention, under circumstances where random writing is not required, by designating a center track of a certain number of tracks as an over-write-only track, for example, for five tracks as shown in FIG. 10, it is possible to further increase magnetic-recording density. In the case of using five tracks, data loss exists only on the one center track and therefore the recording capacity is 4/5 compared to the case where all the tracks are used. In the case of rewriting data which is rewritten less frequently, all five tracks are rewritten. The basic hard-disk drive configuration of Example 6 is similar to the configuration of Example 1 shown in FIG. 1.

In an embodiment of the present invention of Example 6, the extent to which the center track is to be overwritten is established. The extent of ATI is first determined and an allowable offset amount on an over-write-only track that is not used as a data track is established. The over-write-only track here is a track on which no data is written and writing is carried out in the process of recording the two adjacent tracks. Meanwhile, the offset amount is an amount of shift from the center of a recording track, as shown in FIG. 4. In particular, it can be considered that ATI occurs only when a skew is generated on inner and outer radial positions. Under these circumstances, the method of Example 6 can be used in part, as shown in FIG. 3(b). The offset amount is established by a method similar to that of Example 1. The recording order is as follows: first, recording is carried out on the tracks n−2 and n+2 on the outer side of the over-write-only track n; next, recording is carried out on the tracks n−1 and n+1. Information about the over-write-only track and the offset amount is recorded in the memory, or alternatively, is recorded in the control information recording area on the track. The control unit 38 carries out selection of a recording track and control of the offset amount by using the information.

In the embodiment of the present invention of Example 6, the number of tracks constituting a set is not limited to five. The track used as an over-write-only track may be a center track of a set including a specific number of tracks, or alternatively, may be an arbitrary n-th track. Data that is rewritten less frequently is recorded by the method of Example 6 and data that is rewritten more frequently is recorded by using the method of Example 1. In particular, data that is rewritten less frequently is moved to be recorded by using the method of Example 6 to the inner radial side of the magnetic-recording disk, which has a slower peripheral speed, as well as a lessened data-access speed. Data that is rewritten more frequently is recorded by the recording system of Example 1 on the outer radial side of the magnetic-recording disk, which has a higher data-access speed.

In an embodiment of the present invention of Example 6, for monitoring of the rewriting frequency, the number of rewriting operations is monitored separately for each set of tracks and how many times each set of tracks is rewritten is counted. If the number exceeds a threshold value, rewriting to the outer radial side is carried out. Under these circumstances, a buffer area for movement of data is established. In another embodiment of the present invention of Example 6, the method can be applied to a magnetic-recording head having an extremely broad write width, so that a magnetic-recording head having a large magnetic-recording field can be used, and the SNR can be increased.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A hard-disk drive comprising:
a magnetic-recording disk in which tracks adjacent to each other are magnetically separated in advance;
a spindle motor which drives said magnetic-recording disk;
a magnetic-recording head equipped with a write element and a read element;
an actuator for positioning said magnetic-recording head on a predetermined track on said magnetic-recording disk; and
a control unit;
wherein said control unit is configured to store information about an over-write-only track that is provided for a plurality of tracks including n consecutive tracks in at least a partial radial area of said magnetic-recording disk and that is not dedicated for the magnetic recording of data, and an offset amount; and
wherein, in a radial area of the magnetic disk where said over-write-only track is located, said control unit is configured to record with an offset by an offset amount from a center of a track toward said over-write-only track with respect to n−1 tracks of said plurality of n tracks, excluding said over-write-only track, wherein a substantially defective track confirmed separately by another unit is configured as said over-write-only track.

2. The hard-disk drive of claim 1, wherein one of two consecutive tracks is configured as said over-write-only track.

3. A hard-disk drive comprising:
a magnetic-recording disk in which tracks adjacent to each other are magnetically separated in advance;
a spindle motor which drives said magnetic-recording disk;
a magnetic-recording head equipped with a write element and a read element;

an actuator for positioning said magnetic-recording head on a predetermined track on said magnetic-recording disk; and a control unit;

wherein said control unit is configured to store information about an over-write-only track that is provided for a plurality of tracks including n consecutive tracks in at least a partial radial area of said magnetic-recording disk and that is not dedicated for the magnetic recording of data, and an offset amount; and wherein, in a radial area of the magnetic disk where said over-write-only track is located, said control unit is configured to record with an offset by an offset amount from a center of a track toward said over-write-only track with respect to n−1 tracks of said plurality of n tracks, excluding said over-write-only track and wherein a center track of three consecutive tracks is configured as said over-write-only track, and tracks on both sides of said over-write-only track are configured to receive recorded data.

* * * * *